(12) United States Patent
Hoang et al.

(10) Patent No.: US 6,549,087 B1
(45) Date of Patent: Apr. 15, 2003

(54) VARIABLE EQUALIZER WITH INDEPENDENTLY CONTROLLED BRANCHES BASED ON DIFFERENT FREQUENCY BREAKPOINTS

(75) Inventors: Peter Sung Tri Hoang, Alpharetta, GA (US); Earl A. Daughtry, Lawrenceville, GA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/229,234

(22) Filed: Jan. 12, 1999

(51) Int. Cl.⁷ ................................................. H04B 3/14
(52) U.S. Cl. ........................................ 333/15; 333/28 R
(58) Field of Search .................. 333/28 R, 18

(56) References Cited

U.S. PATENT DOCUMENTS

| | | | |
|---|---|---|---|
| 4,208,640 A | 6/1980 | van der Meijs | 178/63 E |
| 4,759,035 A | 7/1988 | McGary et al. | 333/18 |
| 5,214,505 A | 5/1993 | Rabowsky et al. | 455/67.4 |
| 5,789,993 A | 8/1998 | Comte et al. | |

FOREIGN PATENT DOCUMENTS

WO WO 98/54893 12/1998

*Primary Examiner*—Justin P. Bettendorf
(74) *Attorney, Agent, or Firm*—Fogg and Associates, LLC; David Fogg

(57) ABSTRACT

A variable equalizer is described. The variable equalizer provides for independent control of a number of breakpoints in the frequency response of the equalizer so as to allow the equalizer to be readily tuned to compensate for the tilt of coaxial cables over a wide range of characteristic attenuation. In one embodiment, the variable equalizer includes a two port bridge "T" network with variable top and bottom branches that are independently and selectively adjusted to create a desired frequency response. For example, in one embodiment, the top branches include a number of variable RC networks and the bottom branches include a number of variable LR networks. In some embodiments, PEN diodes provide the variable resistance in these LR and RC networks.

30 Claims, 4 Drawing Sheets

VARIABLE EQUALIZER WITH INDEPENDENTLY CONTROLLED BRANCHES BASED ON DIFFERENT FREQUENCY BREAKPOINTS

TECHNICAL FIELD OF THE INVENTION

The present invention relates generally to the field of telecommunications and, in particular, to a variable equalizer.

BACKGROUND

Cable networks are a common medium for providing video, audio and other data or programming to subscribers. Conventionally, cable networks have one or more head ends that transmit signals to subscribers over a medium that includes coaxial cable. Cable networks typically provide subscribers with programming on a variety of channels. Each channel occupies a distinct frequency band on the coaxial cable.

Signals transmitted over a coaxial cable tend to attenuate or decrease in signal strength or magnitude as the signals propagate away from the head end. Cable networks typically include amplifiers that are placed at various locations in the cable network. The amplifiers increase the magnitude of the signals to compensate for the attenuation due to the distance that the signals have propagated.

The attenuation in the magnitude of signals transmitted over coaxial cable further varies with the frequency of the signals. This is due to the "frequency response" of the coaxial cable. Significantly, the frequency response of a particular coaxial cable depends on the parameters in the construction of the coaxial cable such as, the characteristic impedance of the cable, the inner diameter of the outer conductor, the outer diameter of the inner conductor, the strand factor ($K_1$), the braid factor ($K_2$), the power factor, and the dielectric constant of the insulator of the cable among other parameters. Generally, however, the frequency response of a coaxial cable has a downward or negative slope with increasing attenuation as frequency increases as shown at 102 in FIG. 1. This is often referred to as "cable tilt" or "characteristic attenuation," e.g., the cable loss at a maximum frequency for the cable network subtracted from the cable loss at the minimum frequency for the cable network.

To compensate for cable tilt, the amplifiers each have an equalizer circuit. The frequency response of the equalizer generally has an upward or positive slope with attenuation decreasing with increasing frequency, e.g., the reciprocal of the frequency response of the coaxial cable. A typical frequency response for an equalizer is shown at 100 by way of example in FIG. 1. The cascaded response of a coaxial cable and the equalizer is shown at 104 in FIG. 1. Thus, when properly adjusted, an equalizer compensates for the tilt of a coaxial cable such that the signals in the entire frequency spectrum of the network have a substantially constant attenuation. This is described, mathematically, in equation (1):

$$K = K_c(f) + K_{eq}(f) \quad (1)$$

In equation (1), $K_c(f)$ is the characteristic attenuation or tilt of the coaxial cable and $K_{eq}(f)$ is the characteristic attenuation of the equalizer. The cascaded attenuation due to these two factors is represented by the constant K. This means that the cascaded effect of the cable and the equalizer is independent of frequency over the range of frequencies transmitted by the cable network.

Conventionally, the equalizer circuit can have a fixed or variable frequency response. Fixed equalizers typically exhibit better frequency performance than variable equalizers. However, the fixed equalizers are less versatile and thus require service providers to maintain larger equipment inventories and can cause service disruptions when repairs/upgrades are made to the network.

The frequency response of a variable equalizer can be adjusted to compensate for the tilt in a limited variety of coaxial cables. Traditional variable equalizers use one control signal to adjust the frequency response of top and bottom branches of the equalizer. The equalizer essentially can be represented by a two port bridge "T" network that exhibits the principle of duality. When the control signal is adjusted, the top and bottom branches of the equalizer change in tandem. Thus, the top and bottom branches are not independently controlled. This is done to reduce the complexity of the analog control circuit. As a result, traditional variable equalizers face numerous frequency limitations. These limitations include high insertion loss, poor return loss, flatness (normalized to cable shape), and limited tilt settings (tunable tilt range).

For the reasons stated above, and for other reasons stated below which will become apparent to those skilled in the art upon reading and understanding the present specification, there is a need in the art for an improved variable equalizer.

SUMMARY

The above mentioned problems with equalizers and other problems are addressed by the present invention and will be understood by reading and studying the following specification. A variable equalizer is described which provides for independent control of a number of breakpoints in the frequency response of the equalizer so as to allow the equalizer to be readily tuned to compensate for the tilt of coaxial cables over a wide range of characteristic attenuation.

In one embodiment, the variable equalizer includes a two port bridge "T" network with variable top and bottom branches that are independently and selectively adjusted to create a desired frequency response. For example, in one embodiment, the top branches include a number of variable RC networks and the bottom branches include a number of variable LR networks. In some embodiments, PIN diodes provide the variable resistance in these LR and RC networks. PIN diodes include P-type Intrinsic and N-type regions and function as variable resistors.

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

Figure 1:
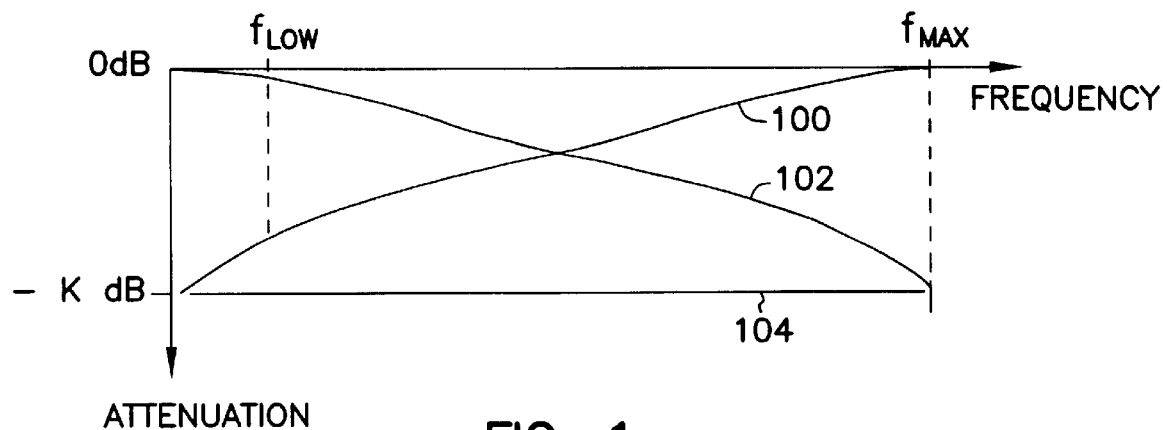
FIG. 1 is a graph that illustrates a typical frequency reponse of a coaxial cable in a cable network.
Figure 2:
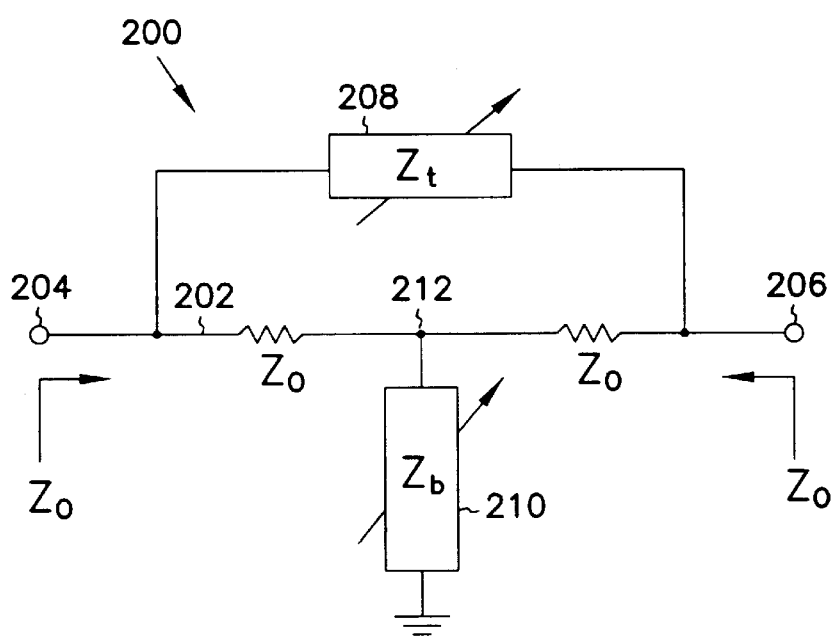
FIG. 2 is a schematic diagram of an embodiment of a variable equalizer constructed according to the teachings of the present invention.

FIG. 2 is a schematic diagram of an embodiment of a variable equalizer, indicated generally at 200, that is constructed according to the teachings of the present invention. Variable equalizer 200 is a two port bridge "T" network with variable top and bottom branches. Variable equalizer 200 includes a main path 202 that includes a signal in port 204 and a signal out port 206. Main path 202 is represented as two resistors, $Z_0$, that are coupled in series between signal in port 204 and signal out port 206. The value of $Z_0$ is chosen to match the characteristic impedance of the cable for a minimum voltage standing wave ratio (VSWR).

Variable equalizer 200 further includes variable top and bottom branches 208 and 210, respectively. Variable top branch 208 is coupled in parallel with main path 202. Variable bottom branch 210 is coupled between node 212 of main path 202 and ground. The variable top and bottom branches 208 and 210 include circuits that adjust one or more frequency breakpoints so as to establish an appropriate frequency response for variable equalizer 200 to compensate for the characteristic attenuation of a selected coaxial cable type. Advantageously, variable top and bottom branches 208 and 210 can selectively and independently adjust the various frequency breakpoints thus providing an equalizer that is adaptable to be used with a wide range of coaxial cable types. This adaptability further provides advantages of improvement in areas of signal performance such as insertion loss, return loss, flatness, tilt range, and ability to compensate for many types of characteristic attenuation.

Figure 3:
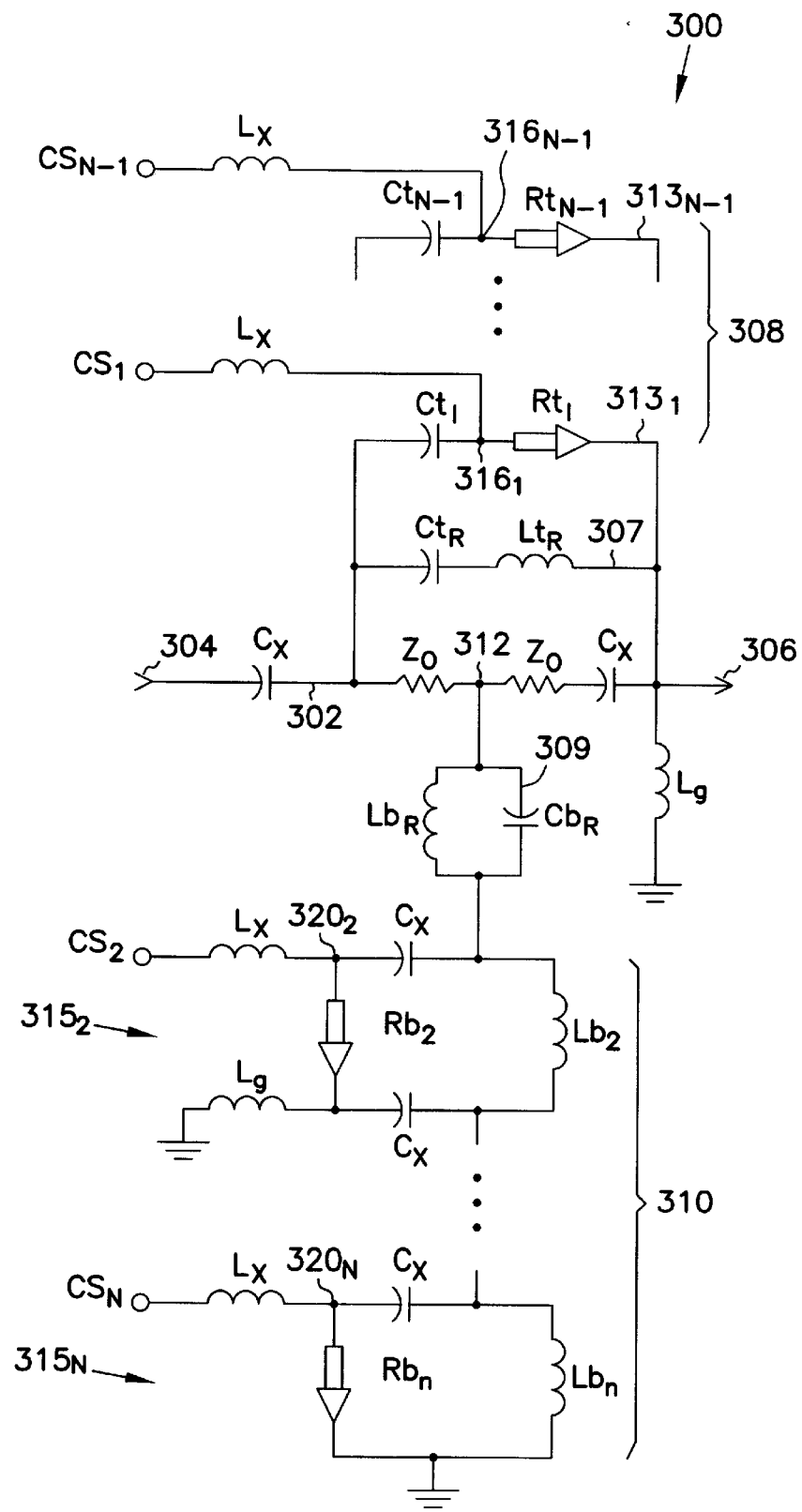
FIG. 3 is a schematic diagram of another embodiment of a variable equalizer constructed according to the teachings of the present invention.

FIG. 3 is a schematic diagram of another embodiment of a variable equalizer, indicated generally at 300, that is constructed according to the teachings of the present invention. Variable equalizer 300 is a two port bridge "T" network with variable top and bottom branches. Variable equalizer 300 includes a main path 302 that includes a signal in port 304 that receives, for example, RF signals from a cable or network amplifier. Variable equalizer 300 also includes a signal out port 306 that provides equalized RF signals to a cable or amplifier. Main path 302 is represented as two resistors, $Z_0$, that are coupled in series between signal in port 304 and signal out port 306. It is noted that main path 302 also includes DC blocking capacitors, $C_x$ that are coupled in series in main path 302.

Variable equalizer 300 further includes top and bottom resonator branches 307 and 309, respectively. Top resonator branch 307 includes series connected capacitor $Ct_R$ and inductor $Lt_R$. Top resonator branch 307 is coupled in parallel with main path 302. Bottom resonator branch 309 includes parallel coupled inductor $Lb_R$ and capacitor $Cb_R$. Bottom resonator branch 309 is coupled to node 312 of main path 302.

Variable equalizer 300 includes variable top and bottom branches 308 and 310, respectively. Variable top branch 308 includes parallel coupled RC networks, $313_1, \ldots, 313_{N-1}$, respectively. The number of RC networks in equalizer 300 can be varied as necessary for a particular implementation and can include as few as one independently controlled branch or RC network. Each RC network $313_1, \ldots, 313_{N-1}$ independently controls one break point for the frequency response of variable equalizer 300. In this embodiment, the resistors of the RC networks are implemented by PIN diodes $Rt_1, \ldots, Rt_{N-1}$ that are each connected in series, respectively, with capacitors $Ct_1, \ldots, Ct_{N-1}$. The resistance of these PIN diodes is selectively adjusted by varying the current through the diodes. This current is established by control signals $CS_1, \ldots, CS_{N-1}$ as applied through RF choke inductors $L_x$ to nodes $316_1, \ldots, 316_{N-1}$, respectively.

Variable bottom branch 310 includes series coupled LR networks, $315_2, \ldots 315_N$, respectively. The number of LR networks in equalizer 300 can be varied as necessary for a particular implementation and can include as few as one branch or LR network. Each LR network $315_2, \ldots, 315_N$ controls one break point for the frequency response of variable equalizer 300. In this embodiment, the resistors of the LR networks are implemented by PIN diodes $Rb_2, \ldots, Rb_N$ that are each coupled in parallel, respectively, with inductors $Lb_2, \ldots, Lb_N$. The resistance of these PIN diodes is selectively adjusted by varying the current through the diodes. This current is established by control signals $CS_2, \ldots, CS_N$ as applied through RF choke inductors $L_x$ to nodes $320_2, \ldots, 320_N$, respectively.

It is noted that inductors $L_g$ are included in some of the bottom branches 310 for DC ground return for the PIN diodes. Each inductor $L_g$ also acts as an RF choke.

Advantageously, each of the control signals $CS_1, \ldots, CS_{N-1}$ and $CS_2, \ldots, CS_N$ can be independently and selectively established to adjust the breakpoints of the top branches 308 and the bottom branches 310, respectively, so as to create a frequency response that compensates for a characteristic attenuation of a selected coaxial cable type. Advantageously, by independently and selectively controlling the breakpoints, equalizer circuit 300 can be used with a wider range of characteristic attenuations. Further, this arrangement provides advantages of improvement in areas of signal performance such as insertion loss, return loss, flatness, and tilt range.

In operation, variable equalizer 300 is adjusted to compensate for the characteristic attenuation of a selected coaxial cable type. Control signals $CS_1, \ldots, CS_{N-1}$ and $CS_2, \ldots, CS_N$ are generated to selectively and independently adjust the breakpoints of the top and bottom branches 308 and 310 of the variable equalizer. Signals are received at signal in port 304 and output at output port 306. Equalizer 300 compensates for the characteristic attenuation of a selected coaxial cable associated with the signals passed through equalizer 300 based on the adjusted top and bottom branches.

Figure 4:
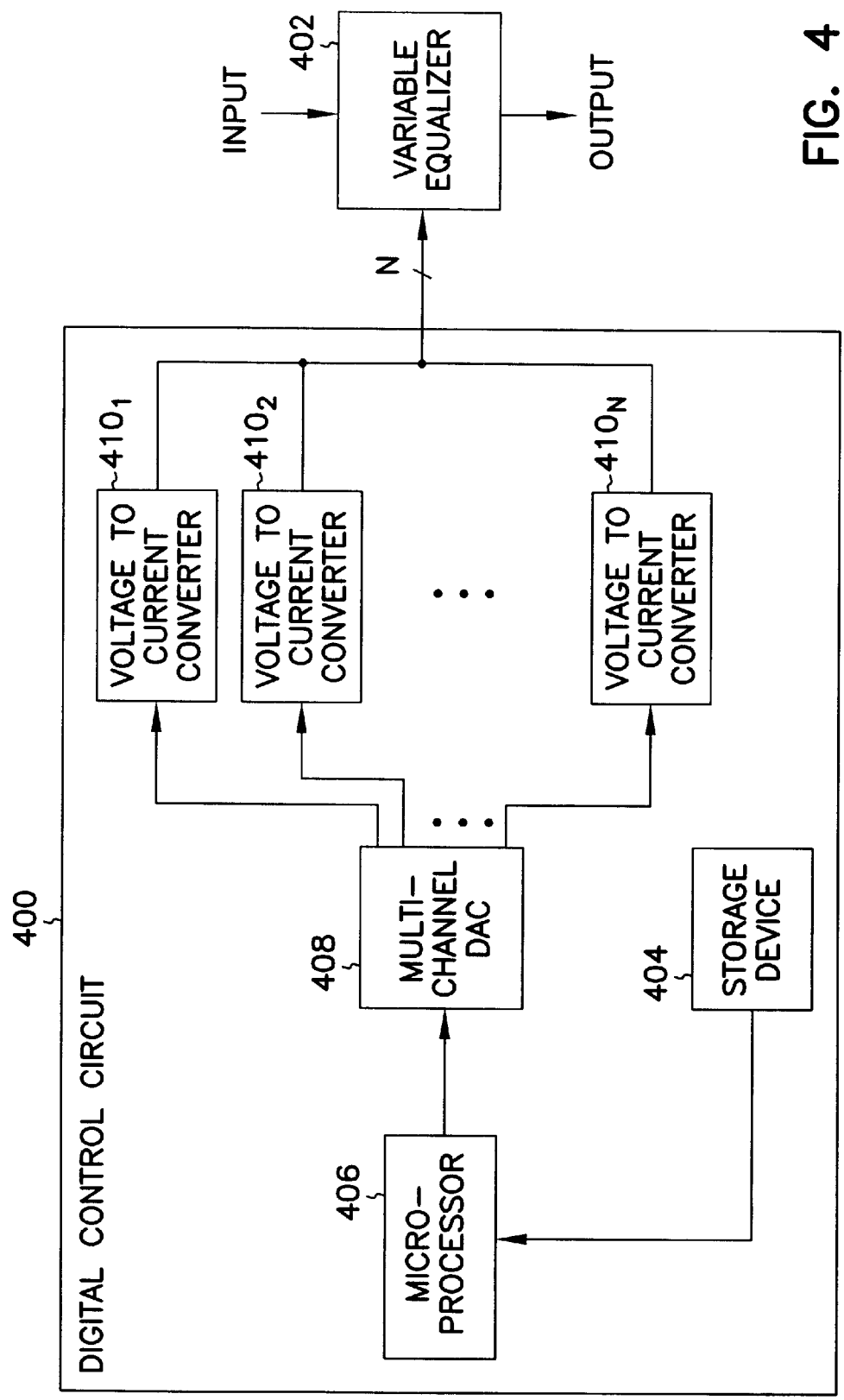
FIG. 4 is block diagram of an embodiment of a digital control circuit coupled to a variable equalizer according to the teachings of the present invention.

FIG. 4 is block diagram of an embodiment of a digital control circuit, indicated generally at 400, coupled to a variable equalizer, indicated at 402, according to the teachings of the present invention. Variable equalizer 402 includes a two port bridge "T" network having a number of independently controllable top and bottom branches. The frequency response of variable equalizer 402 is controlled by selectively and independently adjusting frequency breakpoints of the top and bottom branches based on the control data. For example, variable equalizer 402 may comprise equalizer circuits as shown and described above with respect to FIGS. 2 and 3.

Digital control circuit 400 generates control signals that control the frequency response of variable equalizer 402. Digital control circuit 402 includes storage device 404 that stores data relating to the characteristic attenuation of one or more coaxial cable types. Storage device 404 may comprise a non-volatile memory device that stores N values for tilt settings for various coaxial cable types, e.g., an Electrically Erasable Programmable Read Only Memory (EEPROM), flash memory or other appropriate data storage device. Essentially, storage device 404 acts as a look-up table for digital control circuit 402. The N values stored in storage device 404, in one embodiment, set the current level for PIN diodes of the variable equalizer 402 for a given tilt setting.

Digital control circuit 400 further includes microprocessor 406. Microprocessor 406 can be implemented as an Application Specific Integrated Circuit (ASIC) or as a programmed general purpose microprocessor. Microprocessor 406 reads the data from storage device 404 and creates control data for a selected cable type or tilt setting.

Microprocessor 406 is coupled to multichannel digital to analog converter (DAC) 408. DAC 408 receives the control data from microprocessor 406 and converts the data to analog signals.

Digital control circuit 400 also includes a number of voltage to current converters $410_1, \ldots, 410_N$ that are coupled between the outputs of DAC 408 and the inputs of variable equalizer 402. Converters $410_1, \ldots, 410_N$ create control signals for the PIN diodes in the top and bottom branches of variable equalizer 402. The resistance of a PIN diode is proportional to its DC bias current.

Advantageously, digital control circuit 400 provides the added benefit of being able to remotely change the tilt setting of an equalizer without disrupting service to downstream subscribers.

Figure 5:
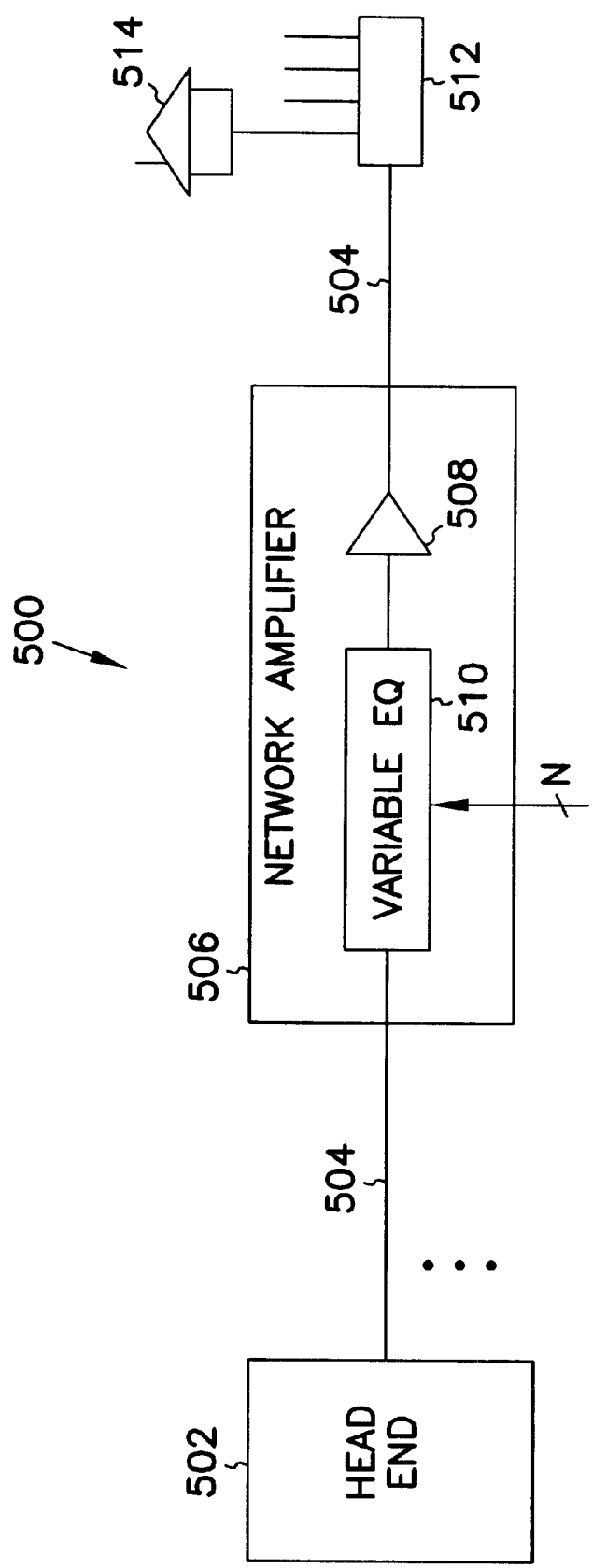
FIG. 5 is a block diagram of an embodiment of a cable system including a number of network amplifiers that each use variable equalizers with a number of control signals to compensate for the characteristic attenuation of the coaxial cable of the network.

FIG. 5 is a block diagram of an embodiment of a cable system, indicated generally at 500, that includes network amplifiers with variable equalizers according to the teachings of the present invention. System 500 includes head end 502 that provides programming to subscribers represented by subscriber's premises 514. It is noted that head end 502 can provide video programming, telephony services, or other appropriate signals over system 500 to subscriber's premises 514.

System 500 includes a network of coaxial cable portions 504 that pass signals from head end 502 to subscriber's premises 514. System 500 further includes network amplifiers 506 that are dispersed throughout the region served by system 500. Network amplifiers 506 are selectively coupled into the network of coaxial cable to amplify, via amplifier circuit 508, the signals transmitted to the subscriber's premises 514. Each subscriber's premises 514 is coupled to a coaxial cable portion by cable drop 512. Each network amplifier 506 includes variable equalizer 510 coupled in series with amplifier circuit 508. Variable equalizer circuit 510 includes a two port bridge "T" network with a number of independently controllable top and bottom branches. The frequency response of variable equalizer 510 is controlled by selectively and independently adjusting frequency breakpoints of the top and bottom branches to compensate for the characteristic attenuation of the coaxial cable portions 504 associated with the network amplifier 506.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, system 500 can be a hybrid fiber/coax (HFC) network with variable equalizers included with the network amplifier portions in the coaxial cable part of the HFC plant. Further, the variable equalizer can be used in other networks that include at least a portion that is formed with coaxial cable. Further, the variable equalizer is not limited to use in the downstream of the cable system. The variable equalizer can be adapted to be used in the upstream as well. Further, other circuit elements and networks can be used in place of the RC and LR networks to create the variable, independently adjustable frequency breakpoints. PIN diodes can be replaced with other elements that provide a variable resistance. Further, present invention is not limited to an equalizer with an equal number of top and bottom branches. The number of top and bottom branches, and hence the number of control signals, can be adjusted as needed for a specific application. Further, the variable resistances of the various branches can be established by signals other than current levels, e.g., voltage levels.

What is claimed is:

1. A digitally controlled equalizer circuit comprising:
   a storage device that stores data relating to the characteristic attenuation of one or more coaxial cable types;
   a microprocessor that reads the data from the storage device and creates control data for a selected cable type;
   a variable equalizer, responsive to the control data from the microprocessor, that includes a two port bridge "T" network having a number of independently controllable top and bottom branches; and
   wherein the frequency response of the variable equalizer is controlled by selectively and independently adjusting frequency breakpoints of the top and bottom branches based on the control data.

2. The circuit of claim 1, and further comprising:
   a multichannel digital to analog converter coupled to the output of the microprocessor to receive the control data; and
   a number of voltage to current converters, coupled between the outputs of the multichannel digital to analog converter and the inputs of the variable equalizer, that create control signals for the variable equalizer.

3. The circuit of claim 1, wherein the top and bottom branches of the variable equalizer each include at least one variable resistor.

4. The circuit of claim 3, wherein the variable resistor comprises a PIN diode.

5. The circuit of claim 3, wherein the variable resistor comprises a component with a resistance that is a function of the component's current.

6. The circuit of claim 1, wherein the microprocessor produces N control signals for N/2 top branches and N/2 bottom branches.

7. A variable equalizer, comprising:
   a main signal path,
   at least one independently controllable, variable top branch coupled in parallel with the main signal path and coupled to receive at least one control signal that selectively establishes at least one frequency breakpoint for the at least one top branch; and
   at least one independently controllable, variable bottom branch coupled between a node in the main signal path and ground, and coupled to receive at least one, different control signal that selectively establishes at least one frequency break point for at least one bottom branch.

8. The equalizer of claim 7, wherein the top and bottom branches of the variable equalizer each include at least one variable resistor.

9. The equalizer of claim 8, wherein the variable resistor comprises a PIN diode.

10. The equalizer of claim 8, wherein the variable resistor comprises a component with a resistance that is a function of the component's current.

11. The equalizer of claim 7, and further comprising N inputs for receiving control signals, and wherein at least one lop branch includes N/2 branches and at least one bottom branch include N/2 branches.

12. The equalizer of claim 7, and further including a top resonator branch coupled in parallel with the variable top branch and a bottom resonator branch coupled in series with the bottom variable branch.

13. The equalizer of claim 7, wherein at least one variable top branch comprises an RC network.

14. The equalizer of claim 7, wherein at least one variable bottom branch comprises an LR network.

15. A cable system comprising:
    at least one head end;
    a network of coaxial cable portions that pass signals from the head end to a number of subscribers;
    a number of network amplifiers that are dispersed throughout the region served by the cable system and selectively coupled into the network of cable to amplify the signals transmitted to the subscribers;
    wherein each network amplifiers includes a variable equalizer having a two port bridge "T" network with a number of independently controllable top and bottom branches; and
    wherein the frequency response of the variable equalizer is controlled by selectively and independently adjusting frequency breakpoints of the top and bottom branches to compensate for the characteristic attenuation of the coaxial cable portions associated with the network amplifier.

16. The system of claim 15, and further comprising a control circuit, including:
    a storage device that stores data relating to the characteristic attenuation of one or more coaxial cable types;
    a microprocessor that reads the data from the storage device and creates control data for a selected cable type;
    a multichannel digital to analog converter coupled to the output of the microprocessor to receive the control data; and
    a number of voltage to current converters, coupled between the outputs of the multichannel digital to analog converter and the inputs of the variable equalizer, that create control signals for the variable equalizer.

17. The system of claim 15, wherein the top and bottom branches of the variable equalizer each include at least one variable resistor.

18. The system of claim 17, wherein the variable resistor comprises a PIN diode.

19. The system of claim 17, wherein the variable resistor comprises a component with a resistance that is a function of the component's current.

20. The system of claim 16, wherein the microprocessor produces N control signals for N/2 top branches and N/2 bottom branches.

21. A variable equalizer comprising:
    a two port bridge "T" network having a number of independently controllable top and bottom branches; and
    wherein the frequency response of the variable equalizer is controlled by selectively and independently adjusting frequency breakpoints of the top and bottom branches.

22. The variable equalizer of claim 21, and further comprising a control circuit, including:
    a storage device that stores data relating to the characteristic attenuation of one or more coaxial cable types;
    a microprocessor that reads the data, from the storage device and creates control data for a selected cable type;
    a multichannel digital to analog converter coupled to the output of the microprocessor to receive the control data; and
    a number of voltage to current converters, coupled between the outputs of the multichannel digital to analog converter and the inputs of the variable equalizer, that create control signals for the variable equalizer.

23. The variable equalizer of claim 21, wherein the top and bottom branches of the variable equalizer each include at least one variable resistor.

24. The variable equalizer of claim 23, wherein the variable resistor comprises a PIN diode.

25. The variable equalizer of claim 23, wherein the variable resistor comprises a component with a resistance that is a function of the component's current.

26. The variable equalizer of claim 22, wherein the microprocessor produces N control signals for N/2 top branches and N/2 bottom branches.

27. A method for controlling a variable equalizer, the method comprising:
    reading data that relates to the characteristic attenuation of one or more coaxial cable types;
    creating control signals for a selected cable type from the read data;
    selectively and independently adjusting the frequency breakpoints of selected top and bottom branches of a two port bridge "T" network to create a frequency response for the variable equalizer that compensates for the characteristic attenuation of a selected coaxial cable type based on the control signals.

28. The method of claim 27, wherein reading data comprises reading data from a storage device with a microprocessor.

29. The method of claim 27, wherein creating control signals comprises:
    converting the read data to analog voltages; and
    converting the analog voltages to current levels.

30. The method of claim 27, wherein creating control signals comprises selectively creating up to N control signals for N/2 top branches and N/2 bottom branches.

* * * * *

UNITED STATES PATENT AND TRADEMARK OFFICE
CERTIFICATE OF CORRECTION

PATENT NO. : 6,549,087 B1
DATED : April 15, 2003
INVENTOR(S) : Hoang et al.

It is certified that error appears in the above-identified patent and that said Letters Patent is hereby corrected as shown below:

Title page,
Item [56], References Cited, U.S. PATENT DOCUMENTS, add the following:
-- 3,663,898   05/1972   Kao et al.   333/18 --.
FOREIGN PATENT DOCUMENTS, add the following:
-- DD 123 255  12/1976 --.

Column 7,
Line 15, replace "lop" with -- top --.

Signed and Sealed this

Tenth Day of January, 2006

JON W. DUDAS
*Director of the United States Patent and Trademark Office*